(12) United States Patent
Chiang

(10) Patent No.: US 6,438,503 B1
(45) Date of Patent: Aug. 20, 2002

(54) ESTIMATION OF DEVICE TEMPERATURE

(75) Inventor: Kevin Chiang, Fremont, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/307,619

(22) Filed: May 7, 1999

(51) Int. Cl.[7] .............................. G01K 1/08; G06F 15/00
(52) U.S. Cl. ....................................... 702/132; 374/102
(58) Field of Search ........................ 702/132, 130, 702/131, 57–59, 64, 65, 69, 117, 118, 124, 125, 133, 182–183; 361/1, 103; 374/100, 101, 102, 103, 169; 714/25, 37, 48, 4, 6; 327/12

(56) References Cited

U.S. PATENT DOCUMENTS

| | | | | |
|---|---|---|---|---|
| 5,014,226 A | * | 5/1991 | Horstmann et al. | 716/4 |
| 5,274,568 A | * | 12/1993 | Blinne et al. | 716/6 |
| 5,838,578 A | * | 11/1998 | Pippin | 716/4 |
| 5,890,100 A | * | 3/1999 | Crayford | 702/130 |
| 5,943,206 A | * | 8/1999 | Crayford | 361/103 |
| 6,090,152 A | * | 7/2000 | Hayes et al. | 716/6 |

* cited by examiner

Primary Examiner—John S. Hilten
Assistant Examiner—Demetrius Pretlow
(74) Attorney, Agent, or Firm—John F. Schipper

(57) ABSTRACT

Method and system for estimating processing time delay $\Delta t_d$ of a selected signal processing device and temperature T of the device. A selected input signal is received by a first sub-system that includes the selected device and by a second sub-system having a controllable time delay, producing first and second sub-system output signals. The first and second sub-system output signals are compared to estimate the time delay of the selected device. A known relationship $T=f(\Delta t_d)$ is used to estimate temperature of the selected device and to determine whether this temperature is higher than a permitted or threshold device operating temperature. First and second signals, having the same or different shape parameters, may be processed by the system, and a statistical average of estimated device time delay can be computed to estimate device temperature.

14 Claims, 5 Drawing Sheets

PROPAGATION DELAY DERATING FACTOR VERUS TEMPERATURE

| Tj°C | Kt | Tj°C | Kt | Tj°C | Kt | Tj°C | Kt |
|---|---|---|---|---|---|---|---|
| -50.0 | 0.745 | 10.0 | 0.940 | 60.0 | 1.133 | 120.0 | 1.356 |
| -40.0 | 0.775 | 20.0 | 0.980 | 70.0 | 1.170 | 130.0 | 1.395 |
| -30.0 | 0.807 | 25.0 | 1.000 | 80.0 | 1.210 | 140.0 | 1.432 |
| -20.0 | 0.837 | 30.0 | 1.020 | 90.0 | 1.245 | 150.0 | 1.470 |
| -10.0 | 0.868 | 40.0 | 1.055 | 100.0 | 1.282 | | |
| 0.0 | 0.900 | 50.0 | 1.095 | 110.0 | 1.322 | | |

Fig. 2

ESTIMATION OF DEVICE TEMPERATURE

FIELD OF THE INVENTION

This invention relates to estimation of device operating temperature in processing a signal, and more particularly to use of indirect methods to estimate such temperature.

BACKGROUND OF THE INVENTION

Ideally, operating temperature for processing of a digital signal by a device, such as a gate, is constant and within the parameter range(s) assumed in the digital design. Practically, the operating temperature associated with signal processing by a given device can vary with time, depending upon the present circumstances and recent history of operation of the device. If the device temperature varies too much from the assumed idealized value, undesirable device responses, such as device malfunction or operation in an undesirable regime, can occur. This is especially true for device temperature that exceeds a threshold temperature value. Inclusion of a system that directly measures such operating temperature is an attractive spectre but is likely to result in an external measure that is too complex, too expensive or too slow acting to fulfill the original function(s) of the device.

What is needed is an approach that uses an indirect method to unobtrusively estimate device operating temperature in a manner that does not interfere with or retard operation of the device and does not add substantially to the complexity or cost of the device. Preferably, this approach should be capable of estimating whether the associated device temperature is above or below a threshold value (yes/no) and should be capable of providing a more precise numerical estimate of the associated device temperature, where such estimate is needed.

SUMMARY OF THE INVENTION

These needs are met by the invention, which provides a system and method for indirectly estimating the operating temperature associated with processing of a digital signal by a digital device. In one embodiment, the invention monitors device time delay to indirectly estimate the device operating temperature, by comparing the time delay of a signal processed by a sample device, such as a gate, with an acceptable time delay for the sample device. Device operating temperature T tends to rise monotonically and continuously with increasing device time delay $\Delta t_d$, although the quantitative details will vary from one type of device to another.

BRIEF DESCRIPTION OF THE DRAWINGS

FIGS. 1 and 2 are a representative graphical view and tabular view of a relationship between device operating temperature and a device time delay factor for signal processing.

DESCRIPTION OF THE INVENTION

Figure 1:
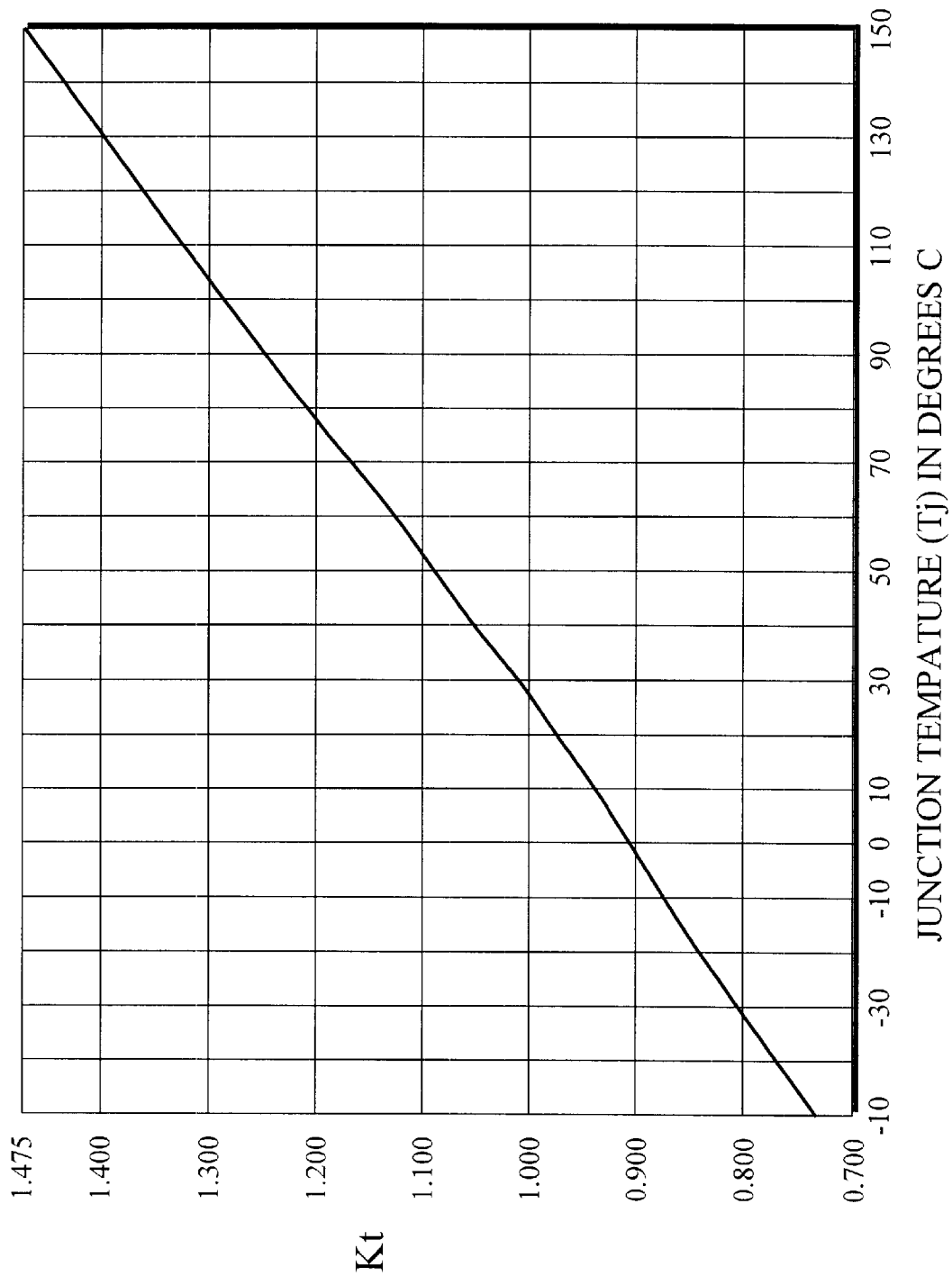

Change in device operating temperature T can manifest itself by change in the time delay $\Delta t_d$ required for processing of a digital signal by the device. In many instances, as device operating temperature increases, device time delay increases monotonically and continuously. FIG. 1 is a representative graphical view of a relationship between device operating temperature T and a time delay proportionality factor $K_t$ associated with processing of a digital signal by that device. The factor $K_t$ has a reference value $K_{t0}=1.00$ at a reference temperature $T_{ref}=25.0°$ C. and is to be multiplied by the device processing time delay at the reference temperature $T_{ref}$. Any other reference temperature $T_{ref}$ and any other reference time delay factor $K_{t0}$ can be used as well. The graphical relationship between $K_t$ and T is approximately linear but may include a non-linear component as shown. This relationship between device temperature T and time delay factor $K_t$ is approximately the same for all devices of a given kind and with given device parameters but may vary statistically by a relatively small amount from one device to another of the given kind.

FIG. 2 presents numerical values for the time delay factor $K_t$ for a sequence of temperatures from $T=-50°$ C. to $T=150°$ C. for a representative device. For an intermediate value of temperature, linear interpolation will provide a reasonable estimate for the time delay factor $K_t$. The time delay factor $K_t$ is estimated by dividing an observed signal processing time delay $\Delta t_d$ for a given device at a given temperature T by a reference time delay $\Delta t_{d0}$:

$$K_t = \Delta t_d / \Delta t_{d0}. \quad (1)$$

The relationship shown in FIG. 1 may be represented approximately by a polynomial $$T = f(K_t) = \sum_{n=0}^{N} a_n (K_t - K_{t0})^n, \quad (2)$$

of chosen degree N in the time delay factor $K_t$, where the $a_n$ are selected polynomial coefficients and the parameter $K_{t0}$ has a selected value. In particular, one may choose $N=1$ and approximate the temperature T over a device operating range by a linear relationship, $$T \approx a_0 + a_1 (K_t - K_{t0}). \quad (3)$$

Choice of a higher value of the degree N, such as $N=2$, 3 or 4, will often provide a more accurate estimate of device operating temperature T from measured device time delay factor $K_t$. If the degree N is chosen to be no greater than 4, it is possible to invert the relationship in (1) to obtain an analytical expression for time delay factor $K_t$ as a function of the device operating temperature T.

Figure 3:
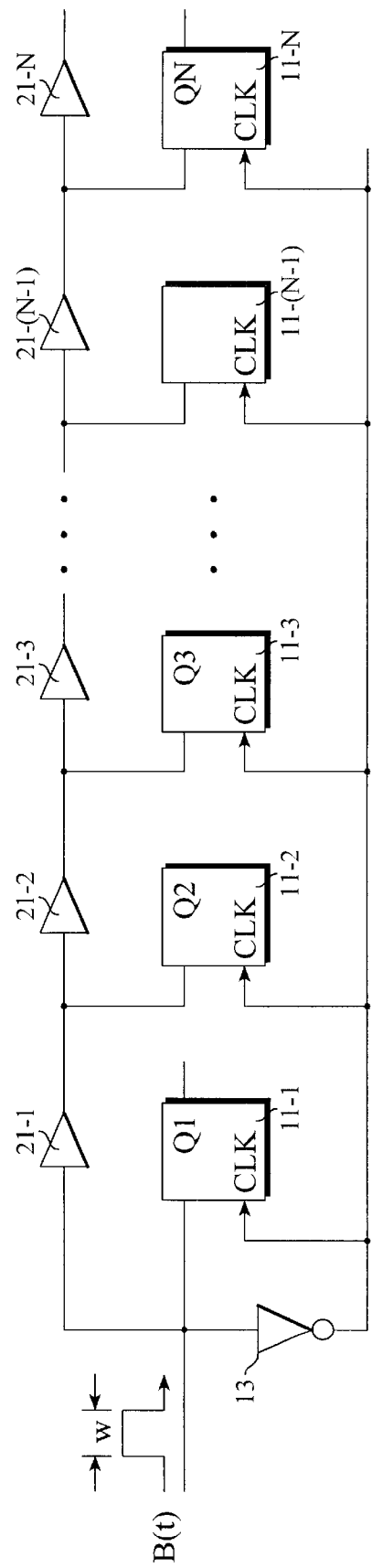
FIGS. 3 and 4 are schematic views of two embodiment of systems for practicing the invention.

FIG. 3 is a schematic view of one embodiment of apparatus that can be used to estimate associated time delay of a device, such as a D-type flipflop and to thereby obtain an estimate of the operating temperature T of this device. An input signal B(t), preferably a positive pulse function having a known pulse width w, is received at a first input terminal of a first D-type flipflop 11-1, where the signal B(t) moves from a low state value (0) to a high state value (1) at a known time $t=t0$ and from a high state to a low state at a known time $t=t0+w$. The input signal B(t) is also inverted by a signal inverter 13 before this signal is received by any of a sequence of D flipflops 11-n ($n=1, 2 \ldots, N; N \geq 2$) . . . A second (clock) input terminal of each of the sequence of D flipflops receives a single clock pulse (CLK) from the inverted input signal B(t)* (in effect, at the time, $t=t0+w'$, corresponding to the falling edge of the pulse function B(t)). Here, $w'-w$ ($\geq 0$) is a determinable time delay for a signal to pass through, and become inverted by, the signal inverter 13. After a short, determinable time delay, $t1-t0$, a first output signal Q0(t) for the first D flipflop 11-1 moves from a low state to a high state at a time $t=t1$, as indicated in FIG. 3. This process is repeated at each of a truncated sequence of D flipflops 11-n.

The input signal B(t) is also received at an input terminal of a first time delay module 21-1, having an associated time delay Δt(0) that is to be determined. Preferably, the effective pulse width w' for the input signal B(t) is substantially greater than a nominal time delay Δt(1) for the first time delay module 21-1. The output signal from the first time delay module 21-1 is sequentially received at an input terminal of a second time delay module 21-2 and at a first input terminal of the second D flipflop 11-2. The output signal from the second time delay module 21-2 is received at an input terminal of a third time delay module 21-3 and at a first input terminal of a third D flipflop 21-3. This process is repeated at each of the sequence of substantially identical time delay modules 21-m and corresponding D flipflops 11-n (n=1, 2, 3, . . . , N−1).

The second input terminal of each D flipflop 11-n will receive a clock pulse B(t)* at the time t=t0+w', and time delay module 21-m will deliver the rising edge of the input signal B(t) to the first input terminal of the D flipflop 21-(m+1) approximately at a time t=t0+(m+1)·Δt(0) (m=1, . . . , N−1). Where the time delay Δt(1) satisfies $$k \cdot \Delta t(1) < w' \leq (k+1) \cdot \Delta t(1) \quad (k=0, 1, \ldots, N-1), \quad (4)$$

a particular pulse arrives at the first input terminal of D flipflop 11-j (j=1 . . . , k) before the clock pulse arrives at the second input terminal of this D flipflop, and the output signal $Q_j(t)$ goes from low to high at the time t=t0+w'. However, the clock pulse arrives at the input terminal of D flipflop 11-j' (j'=k+1, k+2, . . . , N) at a time t=j'·Δt(0) that is too late to respond to the arrival of the clock pulse B(t)*, and the output signal $Q_{j'}(t)$ stays low.

Thus, if the output signals $Q_j(t)$ (j=1, . . . , k) all become high and the output signals $Q_j(t)$ (j=k+1, . . . , N) all stay low, this indicates that the cumulative time delays Δt(j) (j=1, 2, . . . , N) for the time delay modules 21-j satisfy $$\sum_{j=1}^{k} \Delta t(j) < w' \leq \sum_{j=1}^{k+1} \Delta t(j). \quad (5)$$

More practically, one is usually interested only in the output signals $Q_j(t)$ for one, two or three consecutive values of the index j (j=J1, J1+1, J1+2; the earlier output signals (j<J1) and later output signals (j>J1+2) have "don't care" values. If the time delay modules 21-j are all in the same thermal environment and are substantially identical, the time delays Δt(j) (j=1, 2, . . . , N) are substantially identical, and the relations (4) and (5) represent the same situation.

If the minimum time delay $$\Delta t(1) \geq \Delta t_{d,min} = w'/(k+1), \quad (6)$$

from the relation (4), corresponds to an operating temperature T that is greater than a permissible or threshold operating temperature $T_{thr}$ for the module 21-1, the system concludes that the device operating temperature T=f($\Delta t_{d,min}$) is, or will become, too high and takes appropriate remedial action. If the maximum time bound $$\Delta t(1) < \Delta t_{d,max} = w'/k \quad (7)$$

corresponds to an operating temperature T that is less than a permissible operating temperature for the time delay module 21-1, the system concludes that the device operating temperature T=f($\Delta t_{d,max}$) will likely remain in a "safe" range and that no remedial action need be taken at this time.

If the minimum time bound $\Delta t_{d,min}$ corresponds to an operating temperature T=f($\Delta t_{d,min}$) that is less than a permissible or threshold operating temperature for the time delay module 21-1, but the maximum time bound $\Delta t_{d,max}$ corresponds to an operating temperature T=f($\Delta t_{d,max}$) that is greater than a permissible or threshold operating temperature for the device 13, one or more refinements can be introduced, if desired, to obtain a closer estimate of the time delay Δt(1) associated with the device 21-1.

Figure 4:
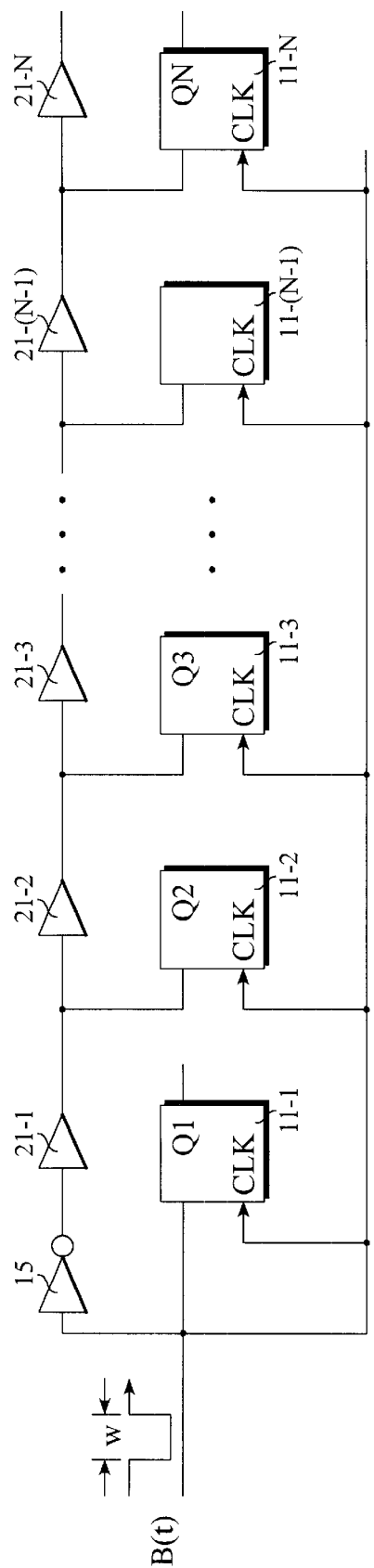

In another embodiment, illustrated in FIG. 4, the input signal B(t) is a negative pulse of width w, the signal inverter 13 of FIG. 3 is removed, and the input signal passes through a signal inverter before this signal is received by any of the sequence of signal time delay modules 21-m (m=1, 2, . . . , N−1). The net effect is the same as in FIG. 3: the clock input terminals of each of the D flipflops 11-n receive a rising edge signal at a time t=t0+w, the time delay module 21-1 receives a rising edge positive pulse at a time t=t0, and the signal time delay module 21-m (m≧2) receives a rising edge positive pulse at a time $$t = t0 + \sum_{k=1}^{m-1} \Delta t(k). \quad (8)$$

Estimation of the time delay Δt(1) for one of the time delay modules 21-m proceeds as before, using the relations (5), (6) and (7) and the relationship between time delay module temperature T and device time delay Δt(1).

Figure 5:
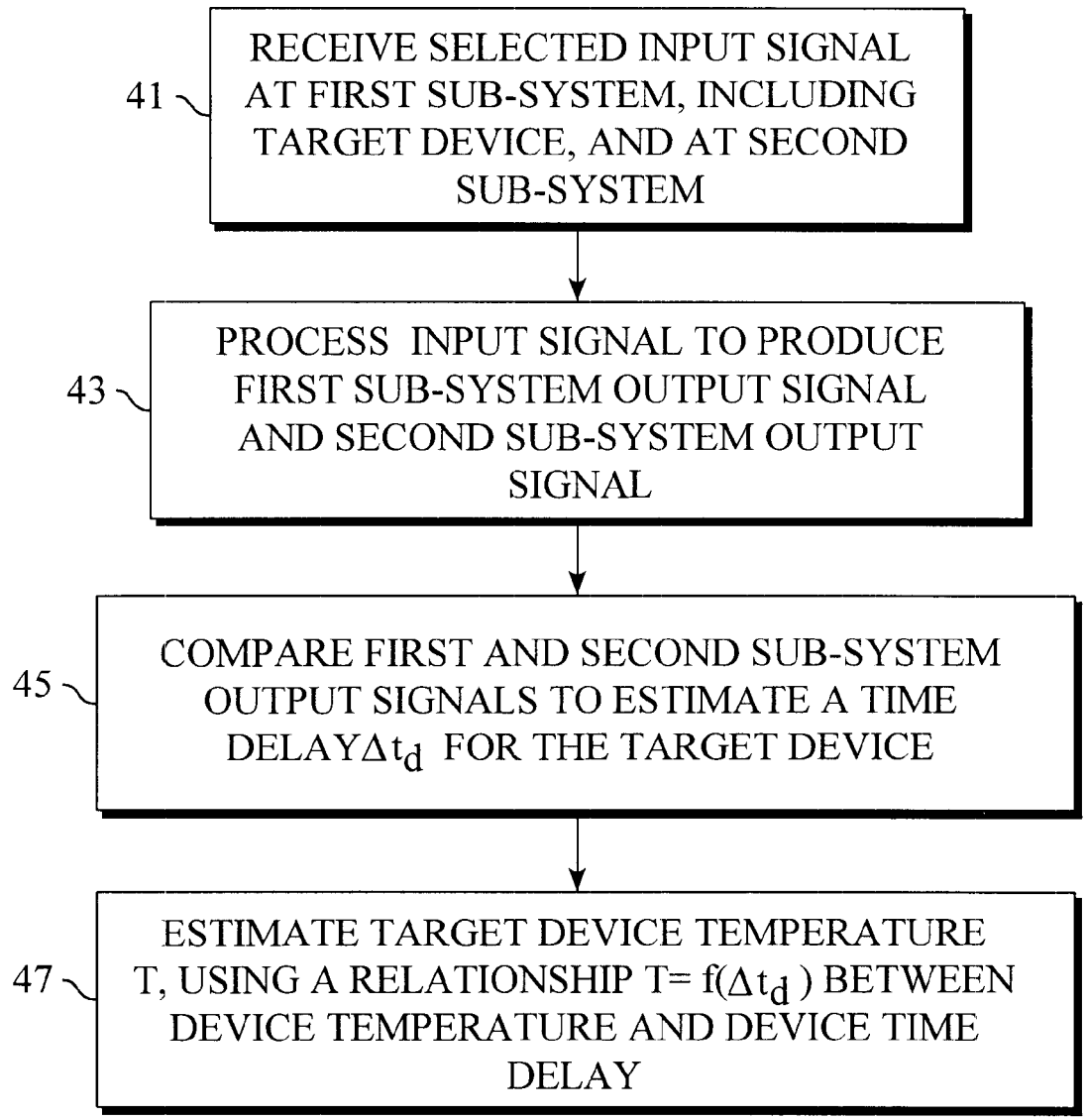
FIG. 5 is a flow chart illustrating a general procedure for practicing the invention.

Other embodiments of a system to determine or estimate time delay $\Delta t_d$ associated with a given device can also be put together. The broad procedure for estimation of device time delay is set forth in a flow chart in FIG. 5. In step 41, a selected input signal is received by a first sub-system, which includes the target device whose time delay is to be estimated, and by a second sub-system that produces a comparison signal. In step 43, the input signal is processed by the first and second sub-systems to produce first and second sub-system output signals. In step 45, the first and second sub-system output signals are compared to estimate a time delay $\Delta t_d$ for the target device. In step 47, a device temperature T is estimated, using a known relationship T=f($\Delta t_d$) between the device temperature and the device time delay $\Delta t_d$.

The system estimates time delay for one or more of an array of substantially identical devices or sub-systems by issuing a pulse or other signal with a selected, and preferably distinguishing, shape and estimating the maximum and (optional) minimum time bounds for signal processing time delay for a representative device. It is preferable to perform the time delay measurements several times and to determine an average time delay from these measurements. Optionally, one or more statistical outliers can be deleted from the data, if the remaining time delay values are consistent with each other. A functional relationship, such as shown in FIG. 1, can then be used to estimate device temperature. Estimation of device time delay and of device temperature can be performed in software or, less preferably, in hardware.

The signal shapes used for the multiple measurements of average time delay can be the same shape. Alternatively, two or more different signal shapes or shape parameters can be used for the multiple signals, consistent with use of digital signals, in order to determine whether signal shape has any consistent effect on the estimated time delay for a given device. Two such shape parameters are the pulse width and the distance between the leading edge of two consecutive pulses.

What is claimed is:

1. A method for estimating the operating temperature of a signal processing device, the method comprising:

estimating a time delay $\Delta t_d$ for a signal processing device to process each of at least two signals;

computing a statistical average $\Delta t_d(avg)$ for said time delays estimated for the at least two signals; and using the statistical average $\Delta t_d(avg)$ in a selected relation between said time delay $\Delta t_d$ and said device operating temperature T to estimate said device temperature.

2. The method of claim 1, further comprising:

when said time delay $\Delta t_d$ exceeds a target time delay $\Delta t_{d,target}$, interpreting this occurrence as indicating that said device operating temperature T exceeds a selected threshold temperature $T_{thr}$.

3. A method for estimating the operating temperature of a signal processing device, the method comprising:

estimating a time delay $\Delta t_d$ for a selected signal processing device to process a signal by:

providing a time dependent signal that changes from a first signal value to a second signal value at a selected time t0 and from the second signal value to a third signal value at a selected time t=t0+w, where w is a selected positive value;

processing the time dependent signal by the selected device;

processing the time dependent signal by a second device, having an associated time delay of approximately w', where w' is a selected value at least equal to w; and comparing time delay $\Delta t_d$ associated with the selected device with the time delay w' associated with the second device; and when the time delay $\Delta t_d$ exceeds a target time delay $\Delta t_{d,target}$, determined with reference to the time delay w, interpreting this occurrence as indicating that the device operating temperature T exceeds a selected threshold temperature $T_{thr}$.

4. A method for estimating the operating temperature of a signal processing device, the method comprising:

estimating a time delay $\Delta t_d$ for a selected signal processing device to process a signal by:

providing a time dependent signal that changes from a first signal value to a second signal value at a selected time t0 and from the second signal value to a third signal value at a selected time t=t0+w, where w is a selected positive value;

receiving the time dependent signal at a clock input terminal of a sequence of N two-input terminal, D flipflop devices, numbered n=1, 2, . . . , N, where N≧2;

passing the time dependent signal through a sequence of signal time delay devices, numbered n=1, 2, . . . , N, with each time delay device introducing a time delay in an output signal of approximately $\Delta t(1)$, where the value $\Delta t(1)$ is less than w and is to be estimated, and receiving the output signal of time delay device number n at a second input terminal of D flipflop device number n+1 with n=1, 2, . . . , N−1;

providing a consecutive number M of D flipflop devices whose output signals all have a selected signal value after a time t=t0+w', where M is at least 2 and w' is a selected value at least equal to w; and estimating the time delay $\Delta t(1)$ of at least one of the time delay devices with reference to the values M and w'; and using a selected relation between the time delay and device operating temperature to estimate device temperature.

5. The method of claim 1, further comprising choosing a first of said at least two signals and a second of said at least two signals to have at least one different signal shape parameter.

6. The method of claim 1, further comprising choosing a first of said at least two signals and a second of said at least two signals to have the same signal shape parameters.

7. A system for estimating the operating temperature of a signal processing device, the system comprising:

a sub-system, including a signal processing device, arranged to estimate a time delay $\Delta t_d$ required for the device to process a selected test signal by:

estimating the time delay $\Delta t_d$ for the device to process each of at least two signals; and computing a statistical average $\Delta t_d(avg)$ for the time delays estimated for the at least two signals; and a computer programmed to receive the statistical average $\Delta t_d(avg)$ and to estimate a temperature of the device, using a selected relation between the statistical average $\Delta t_d(avg)$ and a device operating temperature T.

8. The system of claim 7, wherein said computer is further programmed so that:

when said time delay $\Delta t_d$ exceeds a target time delay $\Delta t_{d,target}$, said computer interprets this occurrence as indicating that said device operating temperature T exceeds a selected threshold temperature $T_{thr}$.

9. A system for estimating operating temperature of a signal processing device, the system comprising:

a sub-system, including a selected signal processing device, arranged to estimate a time delay $\Delta t_d$ required for the selected device to process a selected test signal, the sub-system comprising:

a test signal source that provides a time dependent test signal that changes from a first signal value to a second signal value at a selected time to and from the second signal value to a third signal value at a selected time t=t0+w, where w is a selected positive value;

a first sub-system that receives and processes the test signal, that includes the selected device and that produces a first sub-system output signal;

a second sub-system that receives and processes the test signal, that produces a second sub-system output signal and that has an associated time delay of approximately w', where w' is a selected value at least equal to w;

a signal comparison sub-system to receive the first and second sub-system output signals and to compare the time delay $\Delta t_d$ associated with the selected device with the time delay w' associated with the second sub-system; and a computer programmed to receive the estimated time delay value $\Delta t_d$ and to estimate a temperature of the selected device, using a selected relation between the time delay $\Delta t_d$ and device operating temperature T;

where the computer is further programmed so that, when the time delay $\Delta t_d$ exceeds a target time delay $\Delta t_{d,target}$, determined with reference to the time delay w', the computer interprets this occurrence as indicating that the device operating temperature T exceeds a selected threshold temperature $T_{thr}$.

10. A system for estimating operating temperature of a signal processing device, the system comprising:

a sub-system, including a selected signal processing device, arranged to estimate a time delay $\Delta t_d$ required for the selected device to process a selected test signal, the sub-system comprising:

a signal source that provides a time dependent signal that changes from a first signal value to a second signal value at a selected time t0 and from the second signal value to a third signal value at a selected time t=t0+w, where w is a selected positive value;

N two-input terminal, D flipflop devices, numbered n=1, 2, . . . , N, where N≧2, each having a clock input terminal that receives the time dependent signal;

a sequence of signal time delay devices, numbered n=1, 2, . . . , N, connected together, with time delay device n=1 receiving the time dependent signal and with each time delay device introducing a time delay in an output signal of approximately Δt(1), where the value Δt(1) is less than w and is to be estimated, and receiving the output signal of time delay device number n at a second input terminal of D flipflop device number n+1 with n=1, 2, . . . , N−1;

M D flipflop devices whose output signals all have a selected signal value after a time t=t0+w', where M is at least 2 and w' is a selected value at least equal to w; and a computer programmed to receive the estimated time delay value $\Delta t_d$ and to estimate a temperature of the selected device, using a selected relation between the time delay $\Delta t_d$ and device operating temperature T;

where the computer is programmed to estimate the time delay Δt(1) of at least one of the time delay devices with reference to the values M and w'.

11. The system of claim 7, wherein a first of said at least two signals and a second of said at least two signals have at least one different signal shape parameter.

12. The system of claim 7, wherein a first of said at least two signals and a second of said at least two signals have the same signal shape parameters.

13. The method of claim 4, further comprising:

when said time delay $\Delta t_d$ exceeds a target time delay $\Delta t_{d,target}$, interpreting this occurrence as indicating that said device operating temperature T exceeds a selected threshold temperature $T_{thr}$.

14. The system of claim 10, wherein said computer is further programmed so that, when said time delay $\Delta t_d$ exceeds a target time delay $\Delta t_{d,target}$, said computer interprets this occurrence as indicating that said device operating temperature T exceeds a selected threshold temperature $T_{thr}$.

* * * * *